United States Patent [19]

Marcantonio

[11] Patent Number: 5,066,469

[45] Date of Patent: * Nov. 19, 1991

[54] LEACHING COBALT FROM METAL-CONTAINING PARTICLES

[75] Inventor: Paul J. Marcantonio, San Rafael, Calif.

[73] Assignee: Chevron Research and Technology Co., San Francisco, Calif.

[ * ] Notice: The portion of the term of this patent subsequent to May 22, 2007 has been disclaimed.

[21] Appl. No.: 491,048

[22] Filed: Mar. 9, 1990

Related U.S. Application Data

[63] Continuation-in-part of Ser. No. 749,614, Jun. 26, 1985, Pat. No. 4,927,794.

[51] Int. Cl.$^5$ .............................................. C22B 23/00
[52] U.S. Cl. ..................................... 423/150; 423/53; 423/54; 423/138; 502/26
[58] Field of Search ..................... 423/150, 53, 56, 67, 423/138, 143; 75/242, 622, 623; 502/26

[56] References Cited

U.S. PATENT DOCUMENTS

| | | | |
|---|---|---|---|
| 2,204,193 | 6/1940 | Spicer | 423/56 |
| 2,363,315 | 11/1944 | Grothe | 423/150 |
| 3,567,433 | 3/1971 | Gutnikov | 423/150 |
| 3,653,815 | 4/1972 | Skarbe | 423/56 |
| 3,953,200 | 4/1976 | Im et al. | 423/53 |
| 4,080,421 | 3/1978 | Kasserra | 423/56 |
| 4,145,397 | 3/1979 | Toida et al. | 423/54 |
| 4,382,068 | 5/1983 | Rokukawa | 423/53 |
| 4,409,190 | 10/1983 | Van Leirsburg | 423/150 |
| 4,514,368 | 4/1985 | Hubred | 423/150 |
| 4,554,138 | 11/1985 | Marcantonjo | 423/150 |
| 4,872,909 | 10/1989 | Allen et al. | 423/150 |
| 4,927,794 | 5/1990 | Marcantonio | 423/150 |

FOREIGN PATENT DOCUMENTS

| | | |
|---|---|---|
| 494271 | 7/1953 | Canada . |
| 511474 | 3/1955 | Canada . |
| 1411010 | 10/1975 | United Kingdom . |
| 2127393 | 4/1984 | United Kingdom . |

*Primary Examiner*—Theodore Morris
*Assistant Examiner*—Edward Squillante
*Attorney, Agent, or Firm*—Burns, Doane, Swecker & Mathis

[57] ABSTRACT

A process is disclosed to extract cobalt and optionally, at least one metal value selected from the group consisting of molybdenum, nickel, tungsten, and vanadium from metal-containing particles, such as spent hydroprocessing catalysts particles containing carbon residue. In this process, the spent catalyst particles are roasted in an oxygen-containing gas at a temperature of from 400° C. to 600° C., and the roasted catalyst particles are contacted with an aqueous solution of ammonia, ammonium salt, and hydrogen peroxide. The aqueous solution has an initial pH of at least 9.5 and an initial hydrogen peroxide concentration of from 0.02 to 0.2 M. That aqueous solution is maintained at a pH of greater than 9.5.

13 Claims, No Drawings

LEACHING COBALT FROM METAL-CONTAINING PARTICLES

This is a continuation-in-part application of U.S. application Ser. No. 749,614, filed June 26, 1985, now U.S. Pat. No. 4,927,794.

BACKGROUND OF THE INVENTION

This invention relates to leaching metals from metal-containing particles, such as laterite or spent hydroprocessing catalysts.

One modern development in crude oil processing is the upgrading of metal-containing and sulfur-containing feedstocks such as crude oils and residua by hydroprocessing methods. Such upgrading is necessary to convert the heavy feedstock into more valuable, lower boiling fractions, and to remove metals and sulfur contaminants. These contaminants can pollute the atmosphere upon combustion.

Crude oils contain various dissolved contaminants, such as nickel, vanadium, iron and sulfur. The lighter fractions are frequently distilled off under either atmospheric pressure or a partial vacuum, leaving the metals in a high boiling fraction called the "residua". The residua will generally contain at least about 35 ppm metal contaminants and frequently as high as 100 ppm. In extreme cases, the residua can contain more than 1000 ppm metal contaminants.

The contaminant metals, and any sulfur which is present, are removed by processing the feedstock with a catalyst in the presence of hydrogen. Such catalysts are generally a solid support that contains catalytic metals, generally a Group VIII metal alone or in conjunction with a Group VI metal. The Group VI metal is typically tungsten or molybdenum and the Group VIII metal is typically nickel or cobalt. As the catalyst is used, metals from the feedstock deposit on its exterior surface and the interior surface of its pores, eventually plugging the pores and reducing the activity of the catalyst to such a degree that it does not give the desired product quality. Such catalysts are herein defined as "spent catalyst," and contain catalytic metals, an inorganic support matrix, metals removed from the feedstock sulfur compounds, and a hydrocarbonaceous residuum.

Recently, the crude oil which has been obtained tends to be heavier, forcing refiners to use more hydroprocessing catalysts than previously necessary to remove metals and sulfur from the feedstock. It is expected, therefore, that a shortage will develop of the valuable catalytic metals, particularly cobalt. As a result, efforts have been made to extract metals from hydroprocessing catalysts so that the catalytic metals, the deposited metals, and the catalyst supports can be reused.

One process of leaching hydroprocessing catalysts is described in U.S. Pat. No. 3,567,433. In that process an aqueous ammonia and ammonium salt leach solution is contacted with spent catalyst particles.

Another leaching process is described in *Chemical Abstracts*, 94:178649x. In that process, a spent catalyst containing aluminum, vanadium, nickel, cobalt and molybdenum is leached with ammonia and ammonium salts, at a temperature greater than 110° C. and an oxygen partial pressure of greater than 1 kg/cm$^2$, for more than ½ hour. Such conditions require autoclave reactors.

U.S. Pat. No. 4,216,118 describes chlorinating spent catalysts to convert vanadium values to vanadium tetrachloride and nickel values to nickel chloride for recovery by solvent extraction.

U.S. Pat. No. 4,145,397 describes the recovery of metals from spent catalysts by roasting at high temperatures and leaching with caustic alkali.

U.S. Pat. No. 4,432,949 describes separating metal values from an aqueous stream containing vanadium, molybdenum, nickel and cobalt. In that process, vanadium is first precipitated, and then nickel, cobalt, and molybdenum are removed by serial ion exchange.

U.S. Pat. No. 4,434,141 describes recovering metal values from an aqueous stream. The metal values are preferably obtained by leaching spent hydroprocessing catalysts which include nickel, cobalt, vanadium and molybdenum. The metal values are extracted, isolated and purified by liquid, liquid extraction techniques.

An article in *Engineering and Mining Journal* (May 1978, page 105), describes a plant designed to process spent catalyst containing no cobalt by first leaching with sodium hydroxide and then with ammonium carbonate.

SUMMARY OF THE INVENTION

It is, therefore, an object of the invention to provide a method for leaching cobalt and optionally, at least one of molybdenum, nickel, and vanadium from hydroprocessing catalyst with high yields of each metal value. It has been found that this object can be achieved by, among other things, adding hydrogen peroxide to the leaching solution.

Accordingly, a method is provided by the present invention for extracting cobalt and optionally, at least one metal value selected from the group consisting of molybdenum, nickel, tungsten and vanadium from metal-containing particles, such as spent hydroprocessing catalysts particles containing carbon residue. The particles are first roasted in an atmosphere containing molecular oxygen at a temperature in the range of between 400° C. and 600° C. The particles are then leached, preferably for at least 15 minutes, with an aqueous solution containing ammonia, an ammonium salt, and hydrogen peroxide. The aqueous solution has an initial pH of at least 9.5 and an initial hydrogen peroxide concentration of from 0.02 to 0.2 M. The pH of the aqueous solution is maintained at above 9.5. Preferably, the initial pH is at least 10.0, and more preferably, at least 10.4.

In a preferred embodiment of the invention, the particles are first roasted in an atmosphere containing molecular oxygen at a temperature in the range of 400° C. and 450° C. The particles are then leached for at least 15 minutes with an aqueous solution containing ammonia, an ammonium salt, and hydrogen peroxide at a temperature of from 50° C. to 95° C. The aqueous solution has an initial pH of at least 10.4, an initial hydrogen peroxide concentration of from 0.02 to 0.2 M, an initial ammonia concentration of at least 2 M, and an initial ammonium salt concentration of at least 0.5 M. The pH of the aqueous solution is maintained at above 9.5. The roasting and contacting steps can be repeated as often as needed to increase metals extraction.

DETAILED DESCRIPTION OF THE PREFERRED EMBODIMENTS OF THE INVENTION

As noted above, the present invention can be used to recover metal values from metal-containing particles, such as laterite or spent catalyst particles.

Laterite is a red, porous deposit containing large amounts of aluminum and ferric hydroxides, which is formed by the decomposition of certain rocks. Laterite often contains metal values such as nickel and cobalt. One method of removing the metal values from laterite includes leaching the laterite with ammoniacal ammonium carbonate solutions, but cobalt extraction is incomplete by these methods. By adding hydrogen peroxide to the leaching solution, and by having the solution at a pH of at least 10.0, preferably 10.4, cobalt extraction can be significantly increased.

Spent catalyst particles, as they come from the catalytic reaction vessel, are highly contaminated with carbonaceous deposits and sulfur. These contaminants are easily removed by combustion in an atmosphere containing molecular oxygen (e.g., air). But, if the roasting temperature is too high, the amount of metals leached from the catalyst particles (particularly cobalt, nickel and vanadium) tends to be reduced. For purposes of the present invention, preferable conditions for reaction with oxygen are from 400° C. to 600° C., preferably from 400° C. to 450° C., more preferably from about 400° C. to 440° C. One method for controlling temperature is by diluting the oxygen with nitrogen. The catalysts so treated are free from substantial carbonaceous and sulfide residue and the metals contained therein can be easily removed by an aqueous ammonia leach.

The preferable leach solution is an aqueous solution of $NH_3$(aq) (hereinafter ammonia, $NH_4+$(aq), ammonium from a suitable ammonium salt, and hydrogen peroxide). Such a solution will be alkaline, which is preferred to solubilize vanadium and molybdenum, and will contain free ammonia, an effective complexing agent for nickel and cobalt. Ammonia/ammonium carbonate/hydrogen peroxide solutions are especially well suited as they allow reagent recycle by means of distillation of the pregnant liquor and reabsorption in fresh or recycle aqueous solution. Ammonium sulfate is another preferred ammonium salt for the practice of this invention. Nickel and cobalt will be free cations and form $M(NH_3)_x^{++}$ where x is 3 to 6 (hereinafter ammine complexes), and molybdenum and vanadium will be in the form of oxyanions and will form ammonium salts.

The catalyst support of the spent catalyst particles will frequently be alumina. However, mixtures of alumina with other refractory inorganic oxides such as silica, boria, magnesia and titania, as well as supports that contain naturally occurring alumina-containing clays such as kaoline or halloysite, may be leached by the process of this invention.

In the buffered system, two factors should be adjusted for optimal extraction: the concentration of ammonia, and the pH of the leach solutions. The solution should contain sufficient ammonia to complex the nickel and cobalt which is present. The pH throughout the reaction should be not lower than 9.5. Preferably, the initial pH (which is the pH of the solution prior to contacting with the catalyst particles) is at least 10.0, more preferably, at least 10.4.

It has been found that hydrogen peroxide significantly increases cobalt and vanadium extraction. Therefore, the initial hydrogen peroxide concentration (which is defined as the hydrogen peroxide concentration of the solution prior to contacting with the catalyst particles) should be at least about 0.02 molar (M) and preferably in the range of from 0.02 to 0.2 molar (M). During the leaching step the hydrogen peroxide is preferably maintained at a concentration of at least about 0.02 M and preferably in the range of from 0.02 to 0.2 M.

The initial ammonia concentration (which is defined as the ammonia concentration of the solution prior to contacting with the catalyst particles) should be at least 2 M. The initial ammonium salt concentration (which is defined as the ammonium salt concentration of the solution prior to contacting with the catalyst particles) should be at least 0.5 M.

The roasting step and the contacting step can be repeated as often as necessary to increase metals extraction.

The invention will be further illustrated by the following examples which set forth particularly advantageous method embodiments. While the Examples are provided to illustrate the present invention, they are not intended to limit it in any way.

EXAMPLES

A two-level factorial design experiment was run to determine the effect of hydrogen peroxide and pH on spent catalyst leaching. The roasted catalyst feed was analyzed and found to contain 1.7% Co, 8.3% Mo, 1.4% Ni, and 4.5% V. The hydrogen peroxide concentrations were 0.02 M, 0.08 M, and 0.14 M; and the initial pH levels were 9.6, 10.0 and 10.4 (adjusted with aqueous ammonia). All combinations of these variables were tested and compared with a base-case leach at pH 10.0 which contained no peroxide. The leach conditions were 1 M $(NH_4)_2CO_3$–0.5 M $(NH_4)_2SO_4$; 5% solids, 80° C., three hours.

The results set forth in Table I clearly show that cobalt extraction increased with increasing pH and hydrogen peroxide concentration. The effects of either variable are especially pronounced at low pH or low peroxide concentration. Toward the higher range of both variables, cobalt extraction averages about 78% compared with 51% for the base case without peroxide.

Vanadium extraction was remarkably insensitive to the combination of variables tested. Still, the consistent 88% extraction was a considerable increase over the 78% observed in the base case. The increased vanadium and cobalt extraction was believed to be due to the formation of peroxo complexes.

Molybdenum and nickel extractions were not enhanced by peroxide addition. In fact, nickel extraction seemed to decrease slightly with peroxide. However, at higher pH values, extraction returned to base-case levels of about 80%. Molybdenum extraction was quite steady at about 93%.

TABLE I

EFFECT OF HYDROGEN PEROXIDE AND PH ON METALS EXTRACTED FROM SPENT CATALYSTS

| Test | Initial pH | Equilibrium pH | [$H_2O_2$] Molar | Metals Extraction, % | | | |
|---|---|---|---|---|---|---|---|
| | | | | Co | Mo | Ni | V |
| 1 | 10.00 | 9.75 | 0.00 | 51.3 | 91.8 | 81.1 | 78.3 |
| 2 | 9.60 | 9.42 | 0.02 | 60.6 | 92.5 | 70.5 | 88.1 |
| 3 | 9.60 | 9.44 | 0.08 | 66.6 | 92.3 | 67.4 | 86.6 |
| 4 | 9.60 | 9.47 | 0.14 | 80.2 | 94.3 | 76.2 | 90.6 |
| 5 | 10.00 | 9.70 | 0.02 | 69.3 | 92.7 | 76.9 | 88.0 |
| 6 | 10.00 | 9.77 | 0.08 | 78.2 | 93.6 | 76.4 | 89.4 |

TABLE I-continued

EFFECT OF HYDROGEN PEROXIDE AND PH ON METALS EXTRACTED FROM SPENT CATALYSTS

| Test | Initial pH | Equilibrium pH | [H₂O₂] Molar | Metals Extraction, % | | | |
|---|---|---|---|---|---|---|---|
| | | | | Co | Mo | Ni | V |
| 7 | 10.00 | 9.73 | 0.08 | 75.9 | 93.4 | 76.2 | 87.6 |
| 8 | 10.00 | 9.78 | 0.14 | 75.9 | 93.4 | 72.4 | 88.1 |
| 9 | 10.40 | 9.97 | 0.02 | 72.6 | 93.0 | 82.5 | 88.2 |
| 10 | 10.40 | 9.78 | 0.08 | 81.6 | 93.6 | 80.8 | 88.5 |
| 11 | 10.40 | 9.81 | 0.14 | 78.8 | 93.6 | 79.8 | 88.4 |

While the present invention has been described with reference to specific embodiments, this application is intended to cover those changes and substitutions which may be made by those skilled in the art without departing from the spirit and scope of the appended claims.

What is claimed is:

1. A process to extract cobalt from oxidized, metal-containing particles comprising; contacting said oxidized particles with an aqueous solution of ammonia, ammonium salt, and hydrogen peroxide; wherein said aqueous solution has an initial pH of at least 9.5 and an initial hydrogen peroxide concentration of from 0.02 to 0.2 M; and wherein said aqueous solution is maintained at a pH of greater than 9.5.

2. A process according to claim 1 wherein at least one metal value selected from the group consisting of molybdenum, nickel, tungsten and vanadium is also extracted.

3. A process according to claim 1 wherein said oxidized metal-containing particles are laterite particles.

4. A process according to claim 1 wherein the oxidized metal-containing particles are contacted with the aqueous solution for at least about 15 minutes.

5. A process to extract cobalt from spent hydroprocessing catalyst particles containing carbon residue comprising:

(a) roasting said spent catalyst particles in an oxygen-containing gas at a temperature of from 400° C. to 600° C.; and (b) contacting said roasted catalyst particles with an aqueous solution of ammonia, ammonium salt, and hydrogen peroxide; wherein said aqueous solution has an initial pH of at least 9.5 and an initial hydrogen peroxide concentration of from 0.02 to 0.2 M; and wherein said aqueous solution is maintained at a pH of greater than 9.5.

6. A process according to claim 5 wherein at least one metal value selected from the group consisting of molybdenum, nickel, tungsten and vanadium is also extracted.

7. A process according to claim 6 wherein said temperature in step (a) is from 400° C. to 450° C., and step (b) is carried out for at least about 15 minutes.

8. A process according to claim 6 wherein step (b) is carried out at a temperature of from 50° C. to 95° C.

9. A process according to claim 6 wherein said initial pH in step (b) is at least 10.0.

10. A process according to claim 9 wherein said initial pH in step (b) is at least 10.4.

11. A process according to claim 6 wherein said aqueous solution has an initial ammonia concentration in step (b) of at least 2 M and an initial ammonium salt concentration of at least 0.5 M.

12. A process according to claim 6 wherein steps (a) and (b) are repeated to increase metals extraction.

13. A process to extract cobalt, molybdenum, nickel, and vanadium values from laterite comprising:

(a) contacting the laterite with an aqueous solution of ammonia, ammonium salt, and hydrogen peroxide at a temperature of from 50° C. to 95° C.; wherein said aqueous solution has an initial pH of at least 10.4, an initial hydrogen peroxide concentration of from 0.02 to 0.2 M, an initial ammonia concentration of at least 2 M, and an initial ammonium salt concentration of at least 0.5 M; and wherein said aqueous solution is maintained at a pH of greater than 9.5; and (b) repeating step (a) to increase metals extraction.

* * * * *